Sept. 7, 1954 A. A. MARKSON 2,688,253
PRESSURE DIFFERENTIAL RESPONSIVE DEVICE
Filed Oct. 30, 1950 2 Sheets-Sheet 1
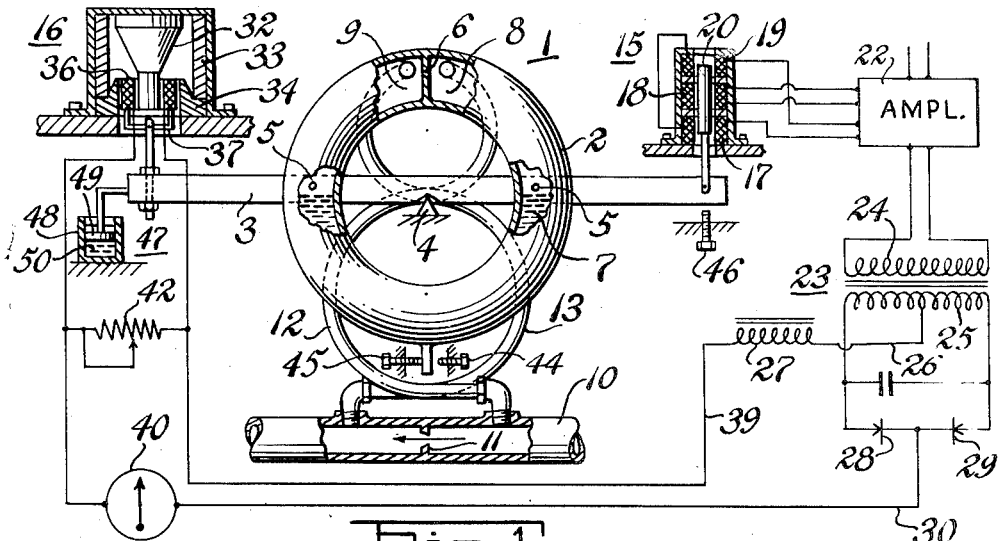
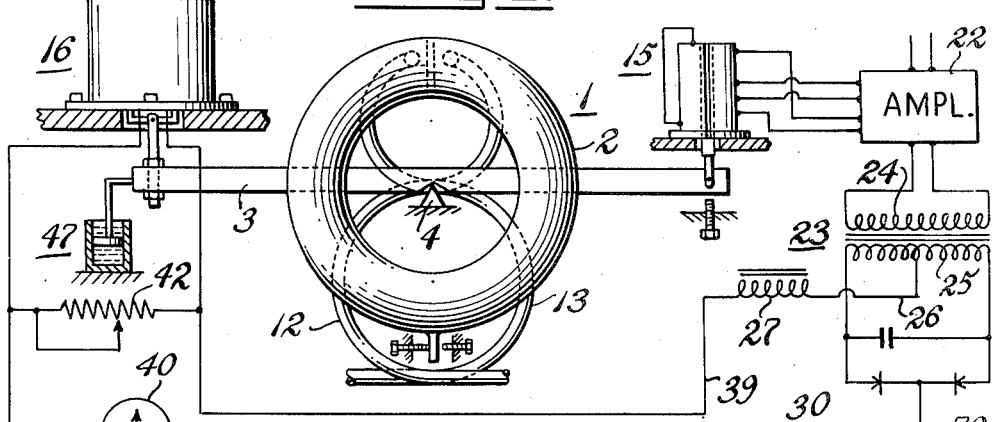
INVENTOR.
ALFRED A. MARKSON
BY
Zugelter & Zugelter
Attys.

Sept. 7, 1954        A. A. MARKSON        2,688,253
PRESSURE DIFFERENTIAL RESPONSIVE DEVICE
Filed Oct. 30, 1950        2 Sheets-Sheet 2

INVENTOR.
ALFRED A. MARKSON
BY Zugelter & Zugelter
Attys.

Patented Sept. 7, 1954

2,688,253

UNITED STATES PATENT OFFICE 2,688,253

PRESSURE DIFFERENTIAL RESPONSIVE DEVICE

Alfred A. Markson, Mount Lebanon Township, Allegheny County, Pa., assignor to Hagan Corporation, Pittsburgh, Pa., a corporation of Pennsylvania Application October 30, 1950, Serial No. 192,944

12 Claims. (Cl. 73—398)

This invention relates to flow responsive devices and more particularly to devices of the ring balance type provided with means for converting the torque developed by pressure differentials resulting from flow through an orifice, for example, into an electric output and means energized by the output for opposing the flow of the torque differential at any instant.

An object of this invention is to provide a flow responsive device of the character referred to above that shall be simple and compact in so far as the mechanical features thereof are concerned, sensitive to changes in flow and accurate and precise in its conversion of the differential torque into an electric output.

A further object of the invention is to provide a flow responsive device of the ring balance type which is so arranged or constructed that the ring has only a slight angular motion throughout the full range of flow and which is provided with means for converting the differential torque into an electric output and with means responsive to the output for developing an opposing and balancing torque on the ring, so that for every value of flow there will be a corresponding and related value of electric output.

A still further object of the invention is to provide a device of the character referred to above in which a differential transformer is utilized as a means for developing an electric output in response to movement of the ring, and a balancing device having a core and coil, the latter being energized by the output of the transformer and arranged to develop and exert a force on the ring that balances the differential torque, the current traversing the coil being a function of the pressure differential acting on the ring.

A further object of the invention is to provide a balancing device in which the core may comprise a permanent magnet whereby the current in the coil thereof required to balance the torque differential for any value of flow is a linear function of the pressure differential.

A still further object of the invention is to provide a balancing device having a core that may be of a material that is magnetized in proportion to the ampere turns of the coil whereby the value of current in the coil required to balance the torque differential at any instant is proportional to the square root of the pressure differential acting on the ring.

A still further object of the invention is to provide a device of the type referred to above which may be utilized as a meter or indicator or which may be utilized to transmit the current output to other points near or remote, where they are received by receivers for conversion to regulating forces or for recording as the case may be.

Other objects of the invention will in part be apparent and will in part be obvious to those skilled in this art from the following description taken in conjunction with the accompanying drawings, in which:

Figure 1 is a more or less diagrammatic view of an embodiment of the invention comprising a flow responsive device of the ring balance type provided with means for developing an electric output that is proportional to angular motion of the ring and with an electro-magnetic balancing device which is energized in accordance with the output to exert an opposing and balancing force on the ring for each and every value of pressure differential imposed thereon;

Figure 2 is a view of the device shown in Fig. 1, coupled to a receiving and recording mechanism which may be located at some point near or remote from the flow responsive device, the apparatus of Fig. 2 including means for recording the pressure differentials acting on the flow responsive device;

Figure 3:
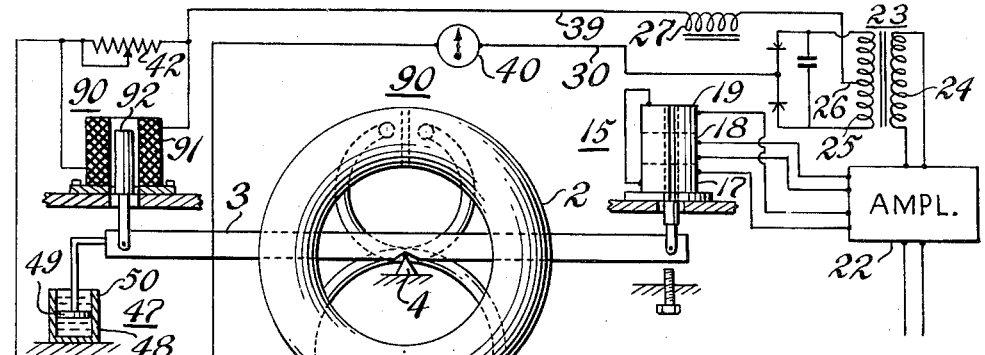
Fig. 3 is a modified form of the device shown in Fig. 1.
Figure 4:
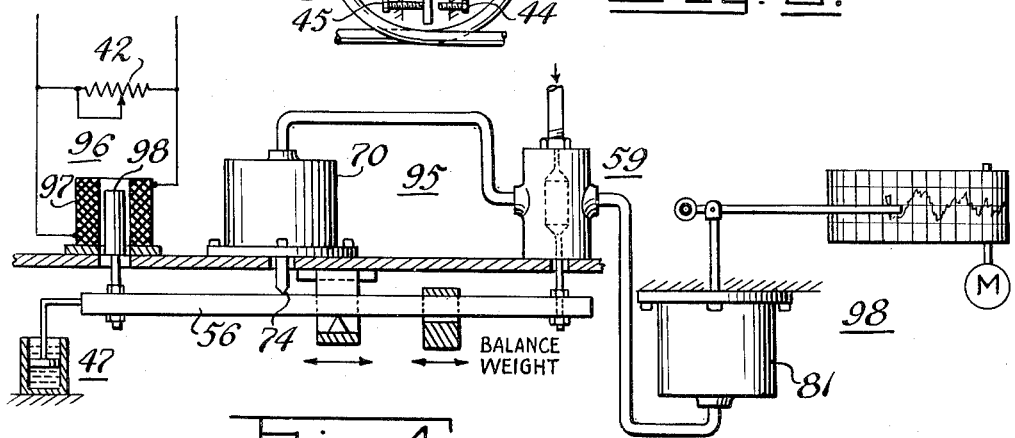
Figure 5:
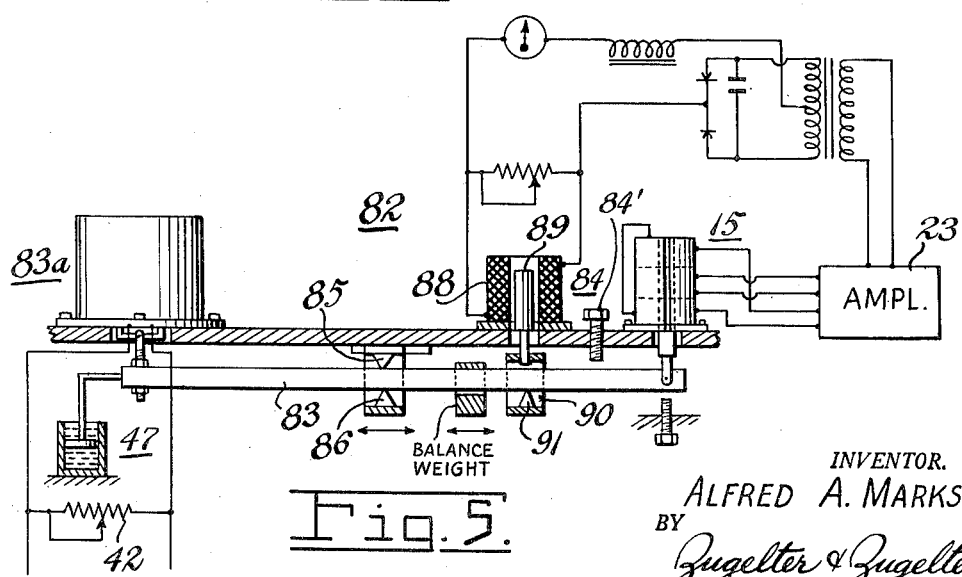

Fig. 4 is a view of a receiving device that may be utilized with either of the flow responsive devices of Figs. 1 and 3, the device including means for receiving the electric output of a device such as shown in Figs. 1 and 3 and converting them into a fluid pressure whose magnitude has a functional relationship to the received or electric input; and Fig. 5 is a view of a receiving device embodying an electric responsive input device, an electric output and an electric balancing device that cause the output to vary as the square root of the input.

Throughout the drawings and the specification like reference characters indicate like parts.

The flow responsive device 1 illustrated in Fig. 1 comprises a hollow ring 2 having secured thereto a cross member 3 by means of which the ring is supported on a knife edge or frictionless bearing 4 located at the geometrical center of the ring.

Within the hollow of ring 2 is a partition 6 located at a point above its center of rotation, and a quantity of heavy liquid 7 such as mercury. The heavy liquid 7 and the partition 6 divide the interior or hollow of the ring into compartments or chambers 8 and 9 to which pressures may be supplied. Where the device is to be utilized to measure flow of a fluid through a pipe or conduit such as shown at 10, the pressure differential created by such flow across an orifice 11 in the pipe is communicated to chambers 8 and 9 by means of flexible tubes 12 and 13, respectively. As shown, tubes 12 and 13 are shaped to form a modified "figure 8" the purpose of this shape being to eliminate the effect of stresses or forces by these tubes as the ring rocks on the fulcrum 4. As shown, tube 12 is connected to the upstream side of the orifice 11 and tube 13 to the down stream side, therefore, the pressure in tube 12 will be higher than that in tube 13 when there is flow in pipe 10. These pressures may be designated $P_1$ and $P_2$ and are imposed on chambers 8 and 9, respectively. The difference between pressures $P_1$ and $P_2$ is the differential across the orifice 11 and this differential action on partition 6 and the liquid 7 produces a torque tending to rotate ring 2 counter-clockwise on bearing 4. This torque may, for convenience, be designated as a differential torque.

Device 1 also includes an electric output device 15 and an electro-magnetic balancing and output modifying device 16. Output device 15, as illustrated, is a differential transformer. This transformer comprises three coil windings 17, 18, and 19 disposed one on the other in coaxial relationship and a movable core 20 that extends into the coil windings as shown. The movable core is connected to support 3 so that as the ring 2 moves on its fulcrum the core is moved axially of the coil windings.

Coil windings 17 and 19 are connected differentially in series, that is, the fields of these windings are opposed to each other. If the windings 17 and 19 are connected to a source of voltage and core 20 is in a position where it extends equally into windings 17 and 19 the voltage induced in winding 18 will be zero. This position of the core may be conveniently referred to as its neutral position. If core 20 is moved upwardly so that more of it is within winding 19 than in winding 17, in response to rotation of ring 2 in a counter-clockwise direction, winding 19 will induce in winding 18 a voltage higher than that induced in winding 18 by winding 17. Consequently the output voltage of winding 18 will be proportional to the difference between the inductions of windings 19 and 17.

The voltage input to windings 17 and 19 may be a relatively low voltage of the order of, say, 6 volts and the output voltage of winding 18 may vary over a range of the order of zero to 1 volt. The output voltage of winding 18 being low, may be amplified by means of amplifier 22 of any desired form. As is understood, amplifiers may embody voltage transformers, and amplifying tubes of known construction and arrangement, the transformers supplying the input voltage for the differential transformers, also.

The output from the amplifier is an alternating current voltage output. This output may be stepped up by means of a transformer 23 and rectified, full wave, and supplied to the balancing device 16. As shown, the transformer 23 comprises a primary winding 24 and a secondary winding 25 having a mid-tap connection 26 in which may be included an impedance 27 whose function it is to smooth out the output voltage. The terminals of the transformer winding 25 are connected to rectifiers 28 and 29 which in turn are connected to an output conductor 30.

The balancing device 16 as illustrated in Fig. 1 comprises a permanent magnet having an internal core member 32, an external core member 33, and a pole piece 34 in which an aperture is formed and through which the internal core member 32 extends, thereby providing an annular air gap in which a coil winding 36 is mounted. The coil winding 36 may be mounted on a support 37 which in turn is secured to cross member 3. The particular form of electromagnetic device 16 illustrated in Fig. 1 is shown and described in my co-pending application Serial Number 184,569, filed September 13, 1950 and assigned to Hagan Corporation, Pittsburgh, Pennsylvania. Since the core of device 16 is of the permanent magnet type, the force exerted by coil 36 on cross member 3 and ring 2 will be a linear function of the current traversing the coil and therefore a linear function of the pressure differential $(P_1-P_2)$. Coil winding 36 is connected to the output conductors 30 and 39 of the rectifier.

In circuit with the output conductor 30 is a meter 40 that indicates the value of current in coil 36 and therefore the magnitude of the pressure differential $(P_1-P_2)$ at any instant. If desired, a high resistance adjustable shunt 42 may be connected across the coil winding 36 for modifying the force developed by device 16 with respect to the differential torque on the ring.

It will be appreciated by those skilled in this art that a differential transformer such as the one shown at 15, will, if the core 20 is permitted to move downwardly past neutral, produce an output voltage that is proportional to the difference between the inductions of coil windings 17 and 19. That voltage would be opposite in phase to the voltage that results when the core is moved upwardly from the neutral induction position. Since the amplifier and rectifier can not distinguish the phase relationships between voltages resulting from the difference between the inductions of windings 19 and 17 or between the inductions of windings 17 and 19, it is necessary to limit movement of the core 20 between two positions, i. e. neutral and one of the two output positions. For that purpose, means are provided for limiting movement of ring 2 in a clockwise direction to a position where core 20 will come to rest in its neutral position, this position corresponding to zero or minimum flow, and to one maximum position. The maximum position is that position in which the output results primarily from winding 19, being the difference between the induction of windings 19 and 17.

To limit movement of core 20 as above described, stops 44 and 45 are provided. Stop 45 will cause ring 2 to come to a fixed position when core 20 is in its neutral position and stop 44 prevents travel of the ring 2 beyond a predetermined maximum position in a counter-clockwise direction and is essentially a safety or limit stop. An auxiliary adjustment or stop 46 may also be provided that acts on cross member 3 at a point under core 20 and may be utilized as a special adjusting stop if needed.

If it be assumed that the flow is zero, the pressure differential $(P_1-P_2)$ will be zero. Therefore, ring 2 will occupy the position shown in Fig. 1 and core 20 will be in its neutral position, being in its neutral position the output delivered to coil 36 by the rectifier will be zero.

If there is flow in pipe 10, a pressure differential $(P_1-P_2)$ will result and will cause ring 2 to turn counter-clockwise. As it turns counter-clockwise, core 20 moves upwardly and the voltage output from winding 18 will be of a value proportional to the displacement of core. This voltage output is amplified and rectified and the current flowing therefrom through coil 36 will cause a force to be developed that is linearly proportional to the current. This force acts upwardly on support 3 tending to turn ring 2 clockwise. As the ring moves clockwise core 20 moves downwardly, whereby the output from winding 18 decreases until the force resulting from the current in coil winding 36 opposes and balances the torque differential acting on the ring. The value of current at that instant of balance will be linearly proportional to the pressure differential $(P_1-P_2)$ and proportional to the square of the flow that produced that differential.

When the ring 2 is balanced by the force of the device 16, against a pressure differential $(P_1-P_2)$ which is greater than zero, it will not be in the neutral position shown in Fig. 1, but slightly displaced therefrom. However, the liquid 7 within the ring will be displaced clockwise so that the level of the liquid on the left hand side of the ring, as seen in Fig. 1, will be higher than on the right hand side. The difference between these levels is a direct measure of the pressure differential $(P_1-P_2)$.

In a ring balance such as shown, there is substantially no friction between the liquid 7 and the interior surface of the hollow ring. There is also substantially no friction at the bearing 4 on which the ring is mounted. Therefore, the ring balance is very sensitive to pressure differentials, because substantially 100% of the pressure differential is effective to produce angular or rotational motion of the ring.

In order to damp out any tendency of device 1 to vibrate or oscillate on its fulcrum 4, a damping device 47 may be provided. This device, as illustrated, comprises a stationary cylinder 48 within which is a loosely fitting piston 49 connected as shown, to support 3. Piston 49 works in a liquid 50 of suitable viscosity and of a type whose viscosity remains substantially constant regardless of temperature.

It will be apparent from the above description that ring 2 will move or turn on its bearing 4 through only a small angle as the flow varies from minimum to maximum flow, and that the liquid 7 will be displaced clockwise in proportion to the pressure differential $(P_1-P_2)$.

In Fig. 2, device 1 of Fig. 1 is utilized to transmit its electric output to a receiving device 55. Device 55 may be located at a point near or remote from device 1. Device 55 may be utilized to effect the control of regulating apparatus where some condition is to be regulated in accordance with flow in pipe 10, or it may be utilized to record the flow at a remote point on a recording chart or other record. Device 1 having been described, similar and corresponding parts thereof will be indicated by the same reference characters as applied to Fig. 1.

The receiving device 55 comprises a beam 56 mounted on a fulcrum 57, an electro-magnetic device 58, an output device 59, a balancing device 60, and a recording mechanism 61. Devices 58 and 16 are similar therefore similar and corresponding parts are identified by similar reference characters. The coil of device 58 is connected in series circuit with coil 36 of device 1; therefore, the currents traversing the two coils are equal and the forces exerted thereby are equal. The coil of device 58 is so connected to beam 56 that its force acts on the beam in a direction that tends to turn it clockwise.

Device 59 may comprise a valve having a valve body 62 and a movable valve member 63 within the body which is arranged to control an inlet port 64 and an exhaust port 65, the exhaust port communicating with the atmosphere. A supply pipe 66 is connected to the inlet port. Supply pipe 66 may be connected to a source of supply of pressure such as compressed air at constant pressure. The pressure established within the valve body 62 is determined by the relative positions of the opposite ends of valve member 63 with respect to the inlet and outlet ports 64 and 65. If valve member 63 is seated on the inlet port, the pressure within the valve body will be atmospheric; if it is seated on the exhaust port, the inlet port being wide open, the pressure within the body will be equal to the pressure of the supply force. As valve member 63 is moved from one to the other of these extreme portions the pressure in the valve body may vary by infinitesimal amounts from zero gauge pressure to a value equal to the pressure of the supply source.

The valve body is provided with an outlet port to which a pipe 67 is connected by means of which pressure is communicated to the balancing device 55. The balancing device 60 comprises a housing 70 within which is disposed a pressure deflectable member such as a bellows 71. The lower end of bellows 71 is secured in pressure-tight relationship to the open end of the housing 70 so as to provide a pressure-tight chamber 73 within the housing. The bellows is connected by a push rod 74 to beam 56. If necessary, a compression spring 75 may be mounted within the bellows. Spring 75 may be one which is just strong enough to return the bellows to its initial position when the pressure in chamber 73 has been reduced to zero. The force exerted by push rod 74 on beam 56 will be proportional to the magnitude of the pressure delivered to chamber 73 and the area of the bellows. If the area of the bellows is a unit area, the force will be directly proportional to the pressure. If it is desired to record the pressure output of valve 59 on a recorder such as indicated at 61, the pressure established by the valve may be utilized to actuate a pen arm 77 which in turn traces a curve on a chart 78. The chart 78 may be driven at a constant speed by means of a motor 79. The curve so traced on chart 78 will provide a record of the pressure differential acting on ring 2.

When the differential acting on ring 2 is zero, the current flowing through the coils of devices 16 and 58 will be zero. As the differential increases this current increases. Since device 58 of receiver 55 receives the output of device 1, the force developed by the coil of device 58 on beam 56 will work in a direction to open the inlet port 64 and throttle the outlet port 65. The valve 63 will be shifted to a position in which the pressure delivered to chamber 73 will be sufficient to balance the force of the coil of device 16. For each value of current in the coil of device 58 there will be a corresponding and definite value of pressure developed by valve 59.

In order that the receiver 55 and ring 1 may have corresponding zero positions, the coils 36 of devices 16 and 58 are provided with adjustable shunts 42 as indicated. By adjusting these shunts the current in the two coils may be so adjusted that device 1 and receiver 55 will have corresponding outputs throughout the entire range of $(P_1-P_2)$.

The pen arm 77 may be actuated by a pressure deflectable member such as a bellows 80 disposed in a pressure-tight housing 81 to which pressure from valve 59 is supplied by a pipe 87. A spring 87' opposes the pressure on member 80 so that the position of the pen arm at any instant will be dependent on the pressure in housing 81.

Instead of utilizing a receiving device such as the device 55, device 1 may be connected to a receiving device 82 such as shown in Fig. 5. The receiver of Fig. 5 is designed to convert the electric output of device 1 into an electric output that is proportional to the square root of pressure differential $(P_1-P_2)$. Device 82 comprises a beam 83 having an electro-magnetic input device 83a which is similar in construction and function to device 16 of device 1 as indicated by similar reference characters, a differential transformer 15, and an electro-magnetic balancing device 84. Since the force of device 83a on beam 83 acts upwardly, a double acting fulcrum is provided, and comprises knife edges 85 and 86 disposed one above and one below the beam, as shown. Since the force of the coil of device 83a tends to turn beam 83 clockwise, the force of the balancing device 84 will act on the beam in a direction tending to turn it counter-clockwise. Since device 83a tends to turn beam 83 clockwise, the core of differential transformer 15 is arranged to move downwardly from neutral position into winding 17 instead of upwardly as in the case of Fig. 1. For this reason, a stop 84' is provided that limits movement of beam 83 in a counter-clockwise direction to a point where core 20 will come to rest in its neutral position when the force of the coil of device 83a is zero.

The balancing device 84 comprises a coil winding 88 that is stationarily mounted and a movable core 89. Core 89 is connected by a yoke 90 to a knife edge 91 that acts upwardly on beam 83. Core 89 is of a material such as soft iron, which will be magnetized in proportion to the ampere turns of winding 88; therefore the force exerted by core 89 on the beam will be proportional to the square of the current traversing the coil. The current traversing winding 88 is supplied by the differential transformer 15, as amplified and rectified by the amplifier 22 and rectifier 23. Since the force exerted by core 89 is proportional to the square of the current traversing coil 88, it follows that the balancing force exerted on beam 83 will be proportional to the square of the current. Therefore, if the current supplied to the coil of device 83a is proportional to the pressure differential $(P_1-P_2)$, the value of current delivered to winding 88 will be proportional to the square root of the current value in device 16a. It therefore follows that the value of current in winding 88 will be proportional to the $\sqrt{(P_1-P_2)}$ and linearly proportional to the flow which produced the differential $(P_1-P_2)$.

In Fig. 3 a modified form of the pressure differential device shown is illustrated in Fig. 1. It differs therefrom only in the form and operating characteristics of the electro-magnetic balancing device 90 employed. Therefore corresponding and similar parts will be designated by the same reference characters. The electro-magnetic balancing device 90 comprises a coil winding 91 which is stationarily mounted, and a core 92 of a material such as soft iron that will be magnetized in proportion to the ampere turns of coil 91. Therefore, the force exerted by core 92 on support 3 which opposes and balances the torque differential on ring 2, will be proportional to the square root of pressure differential $(P_1-P_2)$ and linearly proportional to the flow producing that differential. Coil 91, as shown, is connected to the rectifier 23 in the same manner that coil 36 is connected thereto. By means of the device shown in Fig. 3, the flow may be indicated directly in terms of linear values by means of the meter 40. This meter as is understood by those skilled in this art, may be calibrated in terms of linear values of flow.

In Fig. 4, a receiving device 95 is illustrated which is similar in all respects to the receiving device 55 with the exception of the electro-magnet input device 96. The input device 96 comprises a coil winding 97 which is stationarily mounted and a core 98 of a metal such as soft iron, that will be magnetized in proportion to the ampere turns of coil winding 97. Therefore, the force exerted by core 98 on beam 56 will be proportional to the square of the current traversing winding 97. If, therefore, winding 97 is connected in series circuit with the coil of device shown in Fig. 1, the force developed by device 96 will be proportional to the square of that current and the pressure output developed by device 59 will be proportional to the force produced by the device 96 and applied to beam 3. By utilizing the output pressure of device 59 to actuate a recorder 93, it will be apparent that the curve traced on the recording chart will produce a record of the output pressures of device 59 at any instant of time.

From the above description and the drawings it will be apparent to those skilled in this art that various modifications and changes may be made in the illustrated embodiments without departing from either the spirit or the scope of the invention.

Therefore what I claim as new and desire to be secured by Letters Patent is:

1. A device for mechanically measuring pressure differentials and converting the same into an electric output and electric force that balances the force developed by said differentials comprising a hollow ring having a substantially frictionless bearing at its center of rotation, said ring having therein a partition at a location above said center and a quantity of liquid whereby the partition and liquid divide the hollow of said ring into pressure-receiving chambers, means for supplying pressures of varying magnitude to said chambers, a differential transformer having a core that is movable relative to the windings of said transformer, means for effecting relative movement between said core and windings in response to movement of said ring on its bearing, means for amplifying the voltage output of said transformer, and electromagnetic force producing means including a coil winding connected to said ring, means for energizing said coil winding from said output, the coil of said force producing means being connected to said ring at such a location that the force produced thereby due to said energization opposes and balances the turning force of the pressure differential acting in said chambers at each rotational position of the ring corresponding to each value of pressure differential.

2. A device for mechanically measuring pressure differentials and converting the same into an electric output and an electric force that balances the mechanical force developed by the differentials, said device comprising a hollow ring having a substantially frictionless bearing at its center of rotation, said ring having therein a partition at a location above said center and a quantity of liquid whereby the partition and liquid divide the hollow of said ring into pressure-receiving chambers, means for supplying pressures of varying magnitude to said chambers, a differential transformer having a core that is movable relative to the windings of said transformer, means for effecting relative movement between said core and windings in response to movement of said ring on its bearing, means for amplifying the voltage output of said transformer and rectifying the same, and electromagnetic force producing means including a coil winding connected to said ring, means energizing said coil winding from said rectified output, the coil of said force producing means being connected to said ring at a location such that the force produced thereby due to said energization opposes and balances the turning force of the pressure differential acting in said chambers at each rotational position of the ring corresponding to each value of pressure differential.

3. A device according to claim 1, characterized by the fact that means coacting with said ring are provided limiting motion of the ring in one direction only from zero position, whereby the voltage output range of said transformer is limited to a range of values lying between zero and one maximum value.

4. A device according to claim 1, characterized by the fact that a damping device is connected to said ring for damping forces tending to oscillate said ring on its bearing.

5. A device according to claim 1, characterized by the fact that means are provided for limiting relative movement of said differential transformer winding and its movable core between zero voltage output position and one maximum voltage output position.

6. A device according to claim 1, characterized by the fact that means are provided for limiting relative movement of said differential transformer winding and its movable core between zero voltage output position and one maximum voltage output position, and a damping device connected to said ring for damping forces acting thereon and tending to oscillate the same on its bearing.

7. Apparatus for measuring pressure differentials, converting said differentials into electric voltage that varies with the magnitude of said differentials, and transmitting and converting said output voltage into a pressure force that is a function of said voltage, said apparatus comprising a hollow ring provided with a bearing at its center and having therein a partition located above said bearing and a quantity of liquid dividing the hollow of said ring into pressure receiving chambers, a differential transformer having windings and a core that is movable relative to the windings, means for effecting relative movement between said core and windings in response to movement of said ring on its bearing, to thereby produce a variable output voltage from said transformer, means for amplifying the voltage output of said transformer, electro-magnetic means having a coil winding arranged to be energized by said voltage output for exerting a turning force on said ring that opposes and balances the turning force of the pressure differentials acting in said ring chambers, a valve adapted to establish pressures of varying magnitude in a sending line, force developing means responsive to the voltage output of said differential transformer for actuating said valve, and means responsive to said pressure for exerting a force that opposes and balances the force of said valve actuating means to cause said valve to develop pressures whose magnitudes are a function of the output voltage.

8. A device according to claim 1, characterized by the fact that the electro-magnetic means comprises a permanent magnet and a coil winding disposed in the field of the magnet, said coil winding being energized by said output voltage and exerting a balancing force on the ring that is linearly proportional to the difference between the pressures acting in said ring chambers.

9. A device according to claim 1, characterized by the fact that the electro-magnetic device comprises a magnetizable armature and a coil winding disposed to magnetize said armature in proportion to the ampere turns of the coil winding, said winding and armature being movable relative to one another, one of them being connected to said ring to exert an opposing and balancing force thereon that varies as the square of the output of said differential transformer and consequently as the square of the difference between the pressures acting in said ring chambers.

10. Apparatus for measuring pressure differentials, converting said differentials into electric voltage that varies with said differentials, and transmitting and converting said output voltage into a force that is a function of said voltage and recording the magnitude of said force, said apparatus comprising a hollow ring provided with a bearing at its center and having therein a partition located above said bearing and a quantity of liquid dividing the hollow of said ring into pressure receiving chambers, a differential transformer having windings and a core that is movable relative to the windings, means for effecting said relative movement in response to movement of said ring on its bearing, to thereby produce an output voltage from said transformer, means for amplifying the voltage output of said transformer, electro-magnetic means having a coil winding arranged to be energized by said voltage output for exerting a turning force on said ring that opposes and balances the turning force of the pressure differentials acting in said ring chambers, a beam mounted on a fulcrum, a differential transformer having a movable core actuated by said beam for varying the output of said transformer, means for amplifying the output of said transformer, an electromagnetic device having a coil winding connected in series with the coil winding acting on said ring, and an electro-magnetic device having a coil winding energized by the voltage output of the transformer whose core is actuated by said beam, for exerting a force on said beam that opposes and balances the force of the other coil winding acting thereon.

11. A device according to claim 10, characterized by the fact that the electro-magnetic device comprises a coil winding and movable core connected to said beam, said core being magnetized in proportion to the ampere turns of the coil winding and exerting an opposing and balancing force that is proportional to the square of the output of said transformer and consequently proportional to square root function of the pressure differential acting in said ring chambers.

12. A device according to claim 10, characterized by the fact that said series connected coil windings are each provided with adjustable shunt resistors whereby the force developed by one of the coil windings may be adjusted relative to the force developed by the other of said coil windings.

References Cited in the file of this patent

UNITED STATES PATENTS

| Number | Name | Date |
|---|---|---|
| 1,191,416 | Gibson | July 18, 1916 |
| 1,855,205 | Schur | Apr. 26, 1932 |
| 2,117,894 | Lenehan | May 17, 1938 |
| 2,280,325 | Vetter | Apr. 21, 1942 |
| 2,451,425 | Allwein | Oct. 12, 1948 |
| 2,558,184 | Lavet | June 26, 1951 |
| 2,593,339 | Ostermann et al. | Apr. 15, 1952 |
| 2,602,660 | Shannon | July 8, 1952 |

FOREIGN PATENTS

| Number | Country | Date |
|---|---|---|
| 875,540 | France | June 22, 1942 |